Patented Nov. 26, 1940

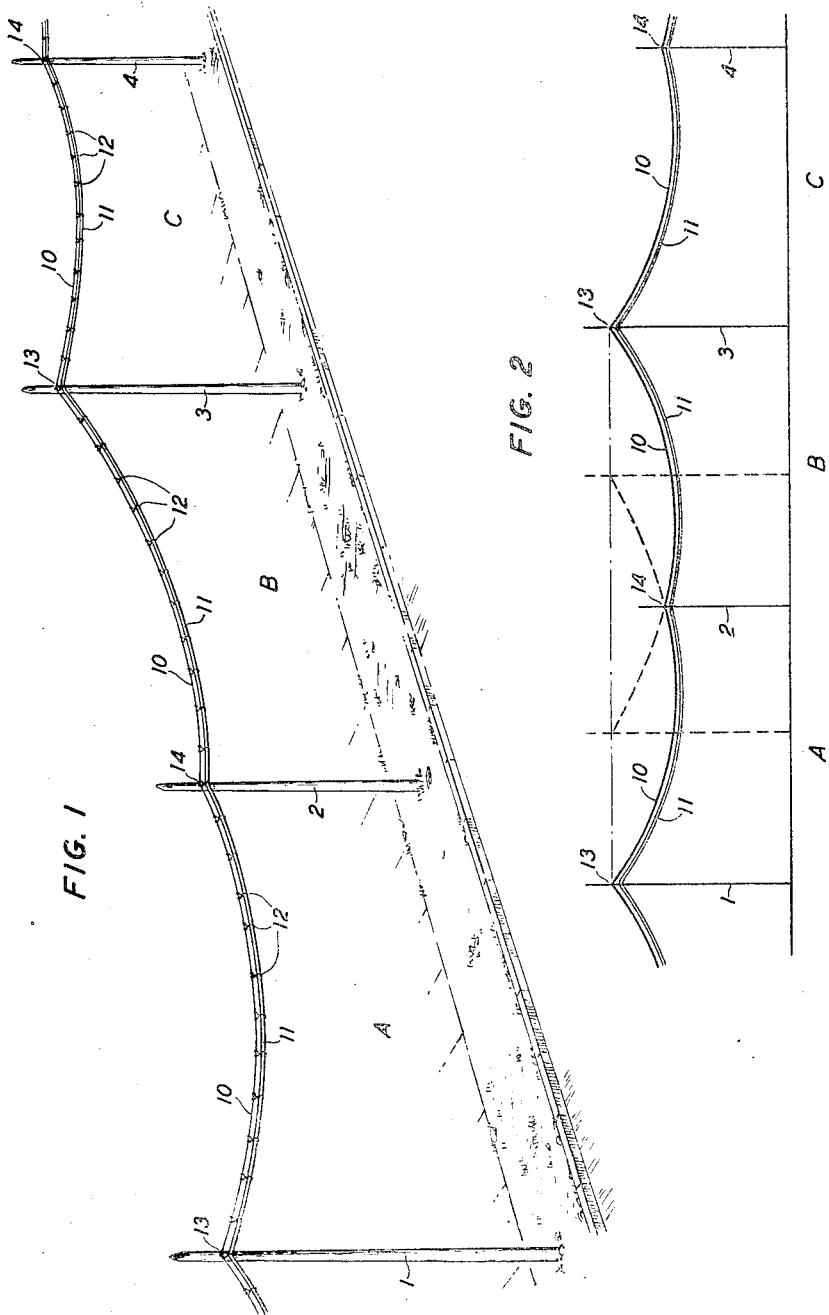

2,222,652

UNITED STATES PATENT OFFICE 2,222,652

METHOD OF SUSPENDING AERIAL CABLES

James A. Carr, Maplewood, N. J., assignor to Bell Telephone Laboratories, Incorporated, New York, N. Y., a corporation of New York Application November 17, 1937, Serial No. 174,994

1 Claim. (Cl. 174—41)

This invention relates to a method of supporting aerial cable and more particularly to a supporting arrangement which will reduce the detrimental effects on the cable which are caused by the excess contraction and expansion of the cable over that of the suspension strand, when subjected to temperature changes which cause bowing and ultimate cracking of the cable sheath.

In the present method of installing aerial cable, a messenger or supporting strand is first secured to each pole of the line and cable supporting rings are then attached to the strand at substantially equal distances, in order to form a support for the cable. The cable is then drawn through these rings where initially it lays substantially free from stress in a position uniformly distant from the supporting strand.

When first installed, the length of the cable and the length of the strand are approximately the same, but as the temperature changes, this relationship changes due to the fact that the coefficient of expansion for the cable is approximately 36 per cent greater than that for the strand; also, since the strand has an initial stretch not experienced by the cable, the temperature elongation for the strand is less than if it were unstressed.

The effect of an increase in temperature above that at which the cable was spliced is such as to make the cable elongate at a faster rate than the strand, thus causing bows to develop in the cable. In the larger sizes of cable, these bows appear near the pole and as a result of swaying in the span the cable is rubbed against the supporting rings, thereby causing abrasion of the cable sheath. Due to the alternate bowing and straining of the cable, which is due to the temperature changes, stresses are set up in the cable sheath, which being concentrated at abrasion points, eventually cause fatigue of the sheath and cracks. These cracks in the sheath permit the entrance of moisture and result in service interruptions. If bowing of the cable can be prevented or materially reduced, a considerable reduction in the maintenance expense for aerial cable will result. If the coefficient of expansion of the strand were such that it would, under tension, elongate with temperature increases at the same rate as the unstressed cable, it is apparent that there would be no bowing of the cable.

It is a primary object of this invention to prevent or materially reduce the detrimental effect upon aerial cable caused by the repeated bowing and straightening of the cable by variations in the temperature.

It is known that in existing long and short spans of the prior art a given drop or rise in temperature puts more stress in a cable in a short span than in a long span; also that the stress per unit of length is due to the greater net difference in length between the cable and strand in a short span than in a long span.

I have found that when the cable goes into compression in a long span the component of compression at right angles to the axis of the cable is greater than in a short span. This larger component in the long span acts to increase the length of the path and thereby reduces the compression over that which would prevail in a short span.

I take advantage of these discoveries and by my method of suspending aerial cable obtain to a certain extent the advantages of long span construction in spans of relatively short length. My method comprises supporting the cable from the supporting strand with regularity at odd-numbered poles at one height with reference to a given horizontal plane and at even-numbered poles at another height with reference to the same horizontal plane.

By virtue of the fact that a span of suspended material with supports at unequal heights is theoretically a portion of a longer span with supports at equal elevations, the benefits outlined and obtainable through the use of the latter are approached through the use of the former.

The invention will be more clearly understood from the following description, when read in connection with the attached drawing, of which:

Fig. 1 illustrates a portion of the pole line with three spans of cable suspended in accordance with applicant's invention; and Fig. 2 is a diagrammatic showing of Fig. 1, which illustrates schematically the effective length obtained by the suspension method, as shown in Fig. 1.

In Fig. 1, there is shown a portion of a pole line which comprises three spans of aerial cable supported from a messenger strand, which in turn is supported from four poles. The spans of cable are indicated by the characters A, B and C and the poles by the numerals 1, 2, 3 and 4. Each of the spans A, B and C comprises a messenger or supporting strand 10 and a cable 11, which is supported from the strand 10 by means of the cable rings 12.

As shown in Figs. 1 and 2, the messenger strand 10 is not supported at the poles 1, 2, 3 and 4 at uniform height, but is supported at alternate poles at unequal levels with respect to the horizontal. For example, the strand 10 is supported at 13 which is one height on odd-numbered poles and at 14 which is a different height at even-numbered poles. As shown in Figs. 1 and 2, the strand 10 is secured at poles 1 and 3 at points 13, approximately 20 feet above the ground level, while at poles 2 and 4 it is secured at points 14 approximately 15 feet above the ground level. Thus, we have the cable 11 supported from the strand 10 at unequal heights 13 and 14 on poles 1, 2, 3 and 4. As shown in Fig. 2, the result of this particular method of supporting the cable at unequal heights results in an effective added span length of approximately 50 per cent. Thus, for a regular or short span of, say 100 feet, I approach, or to an appreciable extent, realize the equivalent of a span of 150 feet, or that shown by the dotted lines in Fig. 2.

Applicant has used the above specific figures as an illustration and has selected them arbitrarily to bring out the invention. It is apparent that applicant's method of supporting cable may be applied to spans of any length and that modifications and changes may be made without departing from the spirit of the invention and that it is only limited by the scope of the appended claim.

What is claimed is:

In a transmission line, a plurality of poles, a supporting strand secured with a regularity to the odd-numbered poles at one height and the even-numbered poles at a different height from a horizontal plane and a cable supported by said strand.

JAMES A. CARR.